United States Patent [19]
Recchione et al.

[11] Patent Number: 5,502,688
[45] Date of Patent: Mar. 26, 1996

[54] FEEDFORWARD NEURAL NETWORK SYSTEM FOR THE DETECTION AND CHARACTERIZATION OF SONAR SIGNALS WITH CHARACTERISTIC SPECTROGRAM TEXTURES

[75] Inventors: Michael C. Recchione, Nutley; Anthony P. Russo, Bloomfield, both of N.J.

[73] Assignee: AT&T Corp., Murray Hill, N.J.

[21] Appl. No.: 344,450

[22] Filed: Nov. 23, 1994

[51] Int. Cl.$^6$ .............................. H04B 11/00; G01S 3/86
[52] U.S. Cl. .......................... 367/131; 367/135; 367/901
[58] Field of Search ................................. 367/131, 135, 367/901, 7, 11, 136; 395/21, 22, 25; 364/923.4, 423; 342/196

[56] References Cited

U.S. PATENT DOCUMENTS

| | | | |
|---|---|---|---|
| 5,181,254 | 1/1993 | Schweizer et al. | 367/131 |
| 5,214,744 | 5/1993 | Schweizer et al. | 395/21 |
| 5,233,354 | 8/1993 | Roth et al. | 342/196 |
| 5,235,339 | 8/1993 | Morrison et al. | 342/196 |

OTHER PUBLICATIONS

Haralick et al., "Textural Features for Image Classification," *IEEE Transactions on Systems, Man, and Cybernetics*, vol. SMC–3, No. 6, Nov. 1973, pp. 610–621.

Weszka et al., "A Comparative Study of Texture Measures for Terrain Classification," *IEEE Transactions on Systems, Man, and Cybernetics*, vol. SMC–6, No. 4, Apr. 1976, pp. 269–285.

A. P. Russo, "Constrained Neural Networks for Recognition of Passive Sonar Signals Using Shape," *Proc. of the IEEE Conf. on Neural Networks for Ocean Engineering*, Washington, DC (1991), pp. 69–76.

Barton et al., "Calibrating the Performance of Neural Networks," *Proc. of the IEEE Conf. on Neural Networks for Ocean Engineering*, Washington, DC, Aug. 1991, pp. 343–351.

Primary Examiner—Daniel T. Pihulic

[57] ABSTRACT

The present invention provides a method and system for characterizing the sounds of ocean captured by passive sonar listening devices. The present invention accomplishes this by first generating a spectrogram from the received sonar signal. The spectrogram is characterized in terms of textural features and signal processing parameters. The textural features and signal processing parameters are fed into a neural network ensemble that has been trained to favor specific features and/or parameters. The trained neural network ensemble classifies the signal as either Type-I or clutter.

11 Claims, 7 Drawing Sheets

ORIGINAL GRAM

Negatively Striated TYPE 1    Positively Striated TYPE 1    Vertically Striated TYPE 1    Unstriated TYPE 1

FEEDFORWARD NEURAL NETWORK SYSTEM FOR THE DETECTION AND CHARACTERIZATION OF SONAR SIGNALS WITH CHARACTERISTIC SPECTROGRAM TEXTURES

BACKGROUND OF THE INVENTION

1. Field of the Invention

The present invention generally relates to the characterization of passive sonar signals and, more particularly, to a feedforward neural network system that uses texture to automatically detect and characterize Type-I sonar signals.

2. Related Art

The Type I Signal Recognition Problem

The sounds of the ocean, captured by passive and active sonar listening devices, are often of interest. Active sonar (so[und] n[avigation] a[nd] r[anging]) listening devices are used to transmit sound waves through water and to receive the signals reflected back from objects in water. The reflected signals are analyzed to extract information regarding such objects. The reflected signals often reveal important information, such as the presence and location of vessels. Passive sonar listening devices only listen to sound (or signals) emitted from objects (e.g., vessels).

Of particular interest is a signal referred to as "Type-I." A Type-I signal refers to a specific sonar signal with a characteristic spectrogram texture. To the untrained eye, the recognition of Type-I energy is difficult; for the trained eye, the discrimination from clutter is still non-trivial, often aided by the use of high-level contextual information not typically captured by current automated processing systems. Fortunately, Type-I signals have exploitable characteristics (some of which were discovered by the inventors) that provide a reliable means to automatically extract and recognize these signals. Some of these exploitable features include:

- the presence of a wideband energy component, which can be characterized by its center frequency, bandwidth, and signal-to-noise ratio (SNR);
- the presence—in most cases—of a narrowband energy component whose frequency is within or in close proximity to that of the wideband energy, which also can be characterized by its frequency, bandwidth, and SNR;
- the frequent presence of a striated pattern or texture on the signal's spectrogram image.

Having identified these features, a number of technical hurdles still exist. The relationships that must be formed from these features in order to discriminate Type-I signals from confusable clutter are complex and non-linear. Compounding the problem is the presence of interfering noise, such as biologics or noise created by a seismic profiler. The noise can obscure the texture of the Type-I signal, or in the case of Jezmonster signals (i.e., noise caused by a school of male finbback whales), bury it completely.

Other schemes are available to identify Type-I signals, but they have not produced adequate results. Standard normalization line tracking schemes are available, but do not produce adequate results on wideband signals like Type I. Most standard normalization schemes suppress wideband signals, and most line extractors are optimized to track narrowband signals only. It is clear, therefore, that the complexity of the problem of detecting and characterizing Type-I signals demands a novel, integrated approach.

Neural Networks

Neural networks (NNs) have emerged as powerful tools for automatic pattern recognition tasks, especially those for which conventional methods fall far short of human performance. A neural network is a computing system made up of many simple, interconnected processing elements. It processes information by its dynamic state response to external inputs. Each processing element receives a number of inputs which are weighted according to their significance. From the weighted total input, the processing element computes a single output signal. In computing the output signal, each processing element learns, i.e., the weights on the inputs change in response to a given input and output pair.

Neural networks are suitable for automatic pattern recognition because the neural networks' ability to "learn" makes them ideal for handling nonlinear problems, which often involve data that are noisy or imprecise. But while theory suggests the broad utility of neural networks, the design of the network remains a difficult task. Many variables must be considered, such as defining the network topology and discovering the optimal set of weights for the network topology. The chosen network topology must hold sufficient complexity to address the given classification task, and the optimization algorithm used to compute the weights must be able to discover the appropriate parameters.

The difficulty of designing a suitable neural network is discussed in the article Barton et al., "Calibrating the Performance of Neural Networks," *Proceedings of the IEEE Conference on Neural Networks for Ocean Engineering*, Aug. 15–17, 1991. The paper offers a procedure to assess the performance of neural network classifiers. An example is described wherein three neural classifiers are tested in their ability to discriminate between a modeled underwater man-made event, real clutter signals, and a modeled quiet ocean background. Without describing the specific topology of the neural networks, the paper discusses a number of important considerations in ascertaining the performance of neural classifiers over a set of test data. For example, the performance of the network will depend on the correct construction of models of the signals to be classified, including the signals of interest (e.g., underwater man-made event), background noise, and confusable clutter. Further, networks designed to exploit the statistical information regarding the signals, such as their probabilities of occurrence, may improve the performance of the classifier. The problem remains, however, as to how to best construct the model of the signals and how to formulate the statistics of the signals.

A neural network used for the recognition of SONAR signals using shape is described in the Russo, A. P., "Constrained Neural Networks for Recognition of Passive Sonar Signals Using Shape," *Proceedings of the IEEE Conference on Neural Networks in Ocean Engineering*, Washington, D.C., (1991), pp. 69–76). The system processes the captured sonar signal by first deriving the spectrogram of the signal. A spectrogram is a display of the frequency content of a signal as a function of time. The various regions of energy on the spectrogram are coded using vectors that trace the regions' outer edges. The vector codes are fed into a neural network classifier which classifies the regions in terms of their distinctive frequency tracks, or more generally, by their shape.

The neural network classifier for shape consists of a bank of three similar but independent feedforward neural networks, each trained separately but with the same training set. Each network in the bank is highly structured—locally connected and greatly constrained. The bank is designed to capture three levels of information from the input pattern—global features, medium size features, and smaller features—while being able to recognize these features equally well regardless of where they occur in the input pattern. The ensemble classifies each pattern as either one of six shapes (e.g., oscillation, C-shape, pos-curve, neg-curve, etc.) or as an "unknown."

The neural network designed to classify signals using shape proves to be useful for distinguishing the frequency tracks within the signals. However, the classifier does not identify the ultimate source of the signals. In other words, while the classifier can specify that a received signal is of "C-shape," it cannot specify what source emitted the "C-shape" signal. A system and method for classifying the source of the received sonar signal is therefore required.

SUMMARY OF THE INVENTION

The present invention provides a system and method for the detection and characterization of Type-I signals using texture information of spectrograms. A neural network is used to analyze the texture information and to recognize unknown sonar signals. A received sonar signal is processed for interference rejection, broad energy detection, frequency tracking, characterization, and classification. A candidate signal is detected using a median detector and tracked using a modified blob-coloring algorithm. It is characterized using both conventional measures, like bandwidth, and textural features derived from co-occurrence statistics and two-dimensional Fourier analysis. A vector of measurements that describes the signal is fed into an ensemble of five feedforward neural networks to produce a preliminary signal classification. A postprocessor interprets the neural network outputs, combines the classification results from each neural network, and makes a final "Type I/clutter" decision.

BRIEF DESCRIPTION OF THE DRAWINGS

The foregoing and other features and advantages of the invention will be apparent from the following more particular description of preferred embodiment of the invention, as illustrated in the accompanying drawings, in which.

DETAILED DESCRIPTION OF THE PREFERRED EMBODIMENT

Figure 1:
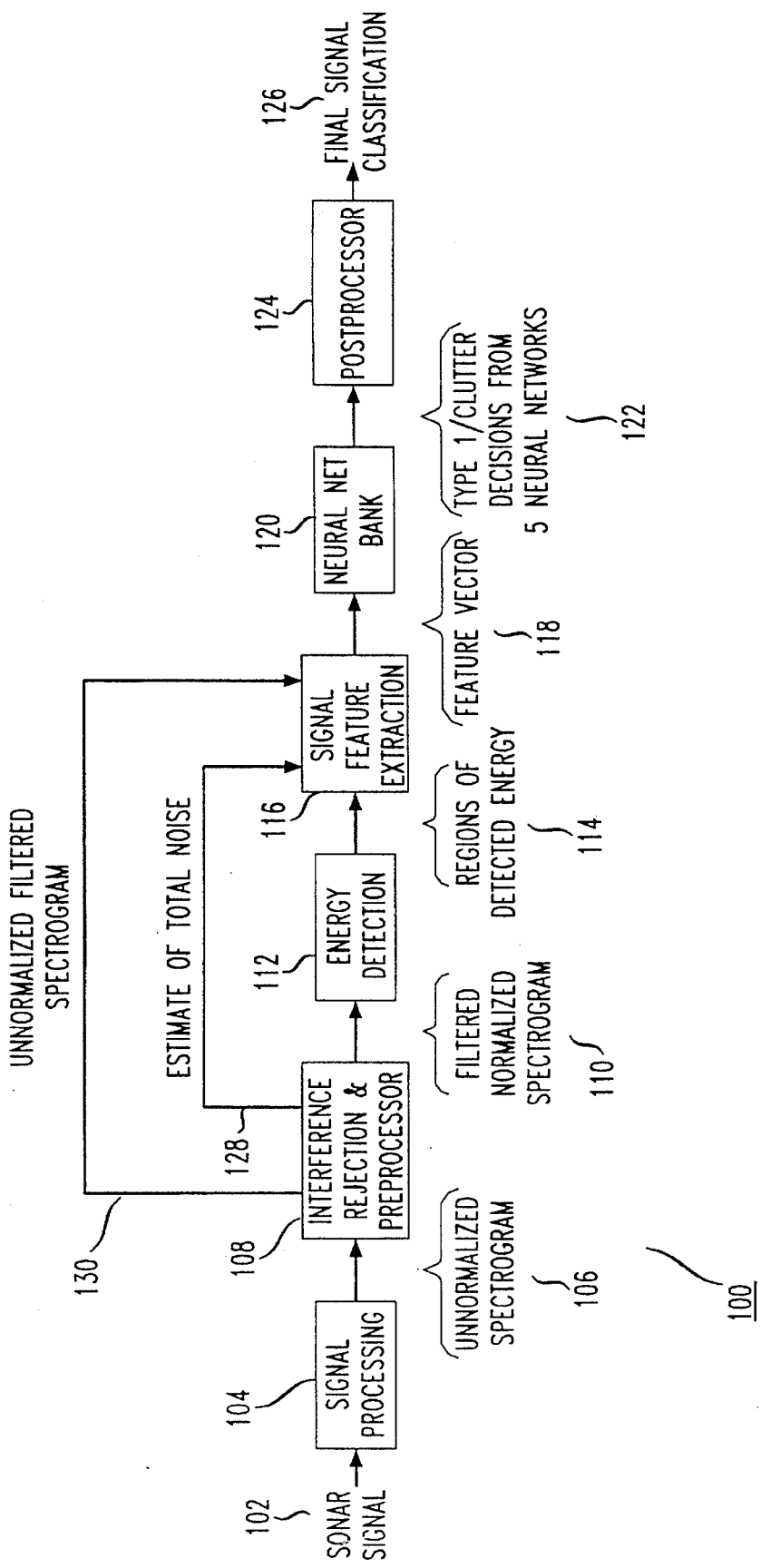
FIG. 1 shows a high level block diagram of the signal detection and characterization system.

FIG. 1 shows a high level block diagram of an automatic system 100 for the detection and characterization of sonar signals with characteristic spectrogram textures (i.e., Type-I signals). A received sonar signal is converted to a timeseries data 102. The timeseries data 102 is transformed into an unnormalized (log power) spectrogram 106 by signal processing module 104. The signal processing module 104 uses a sliding-window Fast Fourier Transform analysis to produce the unnormalized spectrogram 106 with fine time and frequency resolution. The unnormalized spectrogram 106 is filtered using the interference rejection and preprocessor module 108 (hereinafter preprocessor 108) to produce a filtered normalized spectrogram 110. Energy detection module 112 then processes the filtered normalized spectrogram 110 by selecting regions of detected energy 114 whose median power is above a threshold. The selected regions of detected energy 114 are clustered into signal objects and characterized in terms of textural features and traditional signal processing parameters by the signal feature extraction module 116. The signal feature extraction module 116 produces a feature vector 118 for the signal object. The feature vector 118 is fed into an ensemble of five neural network texture classifiers 120. A set of Type-I/clutter decisions 122 are produced by the ensemble of five neural networks 120. The Type-I/clutter decisions 122 are fed into a postprocessor 124. The postprocessor 124 tallies the votes from the five neural networks 120 and applies other logic to make a final Type I/clutter decision 126.

The detailed aspects of the various blocks of FIG. 1 are discussed below.

1. Construction of the Spectrogram

Figure 2:
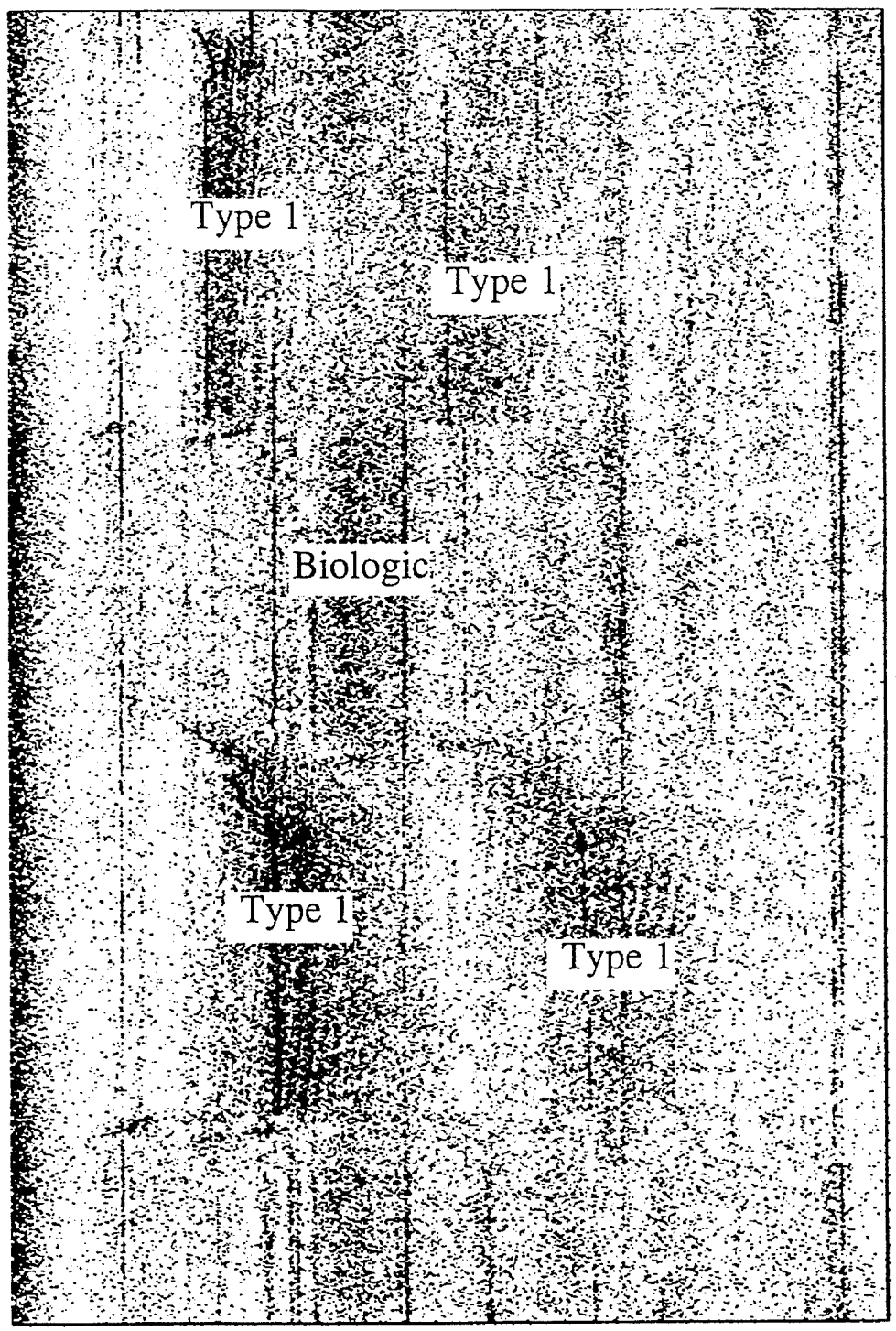
FIG. 2 shows a spectrogram of Type-I and clutter signals.

In a preferred embodiment, the received sonar signal is sampled at 4000 samples/sec to produce timeseries data 102. The sampled data is transformed using sliding-window Fast Fourier Transform (FFT) analysis, resulting in an unnormalized spectrogram 106 with fine time and frequency resolution. An example of the derived spectrogram is shown in FIG. 2. Because the signal of interest is most likely to exist in the frequency range 0 to 2000 Hz, other sampling rates may be used so long as the information within the frequency range of interest is preserved.

In a preferred embodiment, the log of the unnormalized spectrogram 106 is obtained. This step allows for a more manageable dynamic range that can be quantized with 16 bits.

2. Interference Rejection

Figure 3:
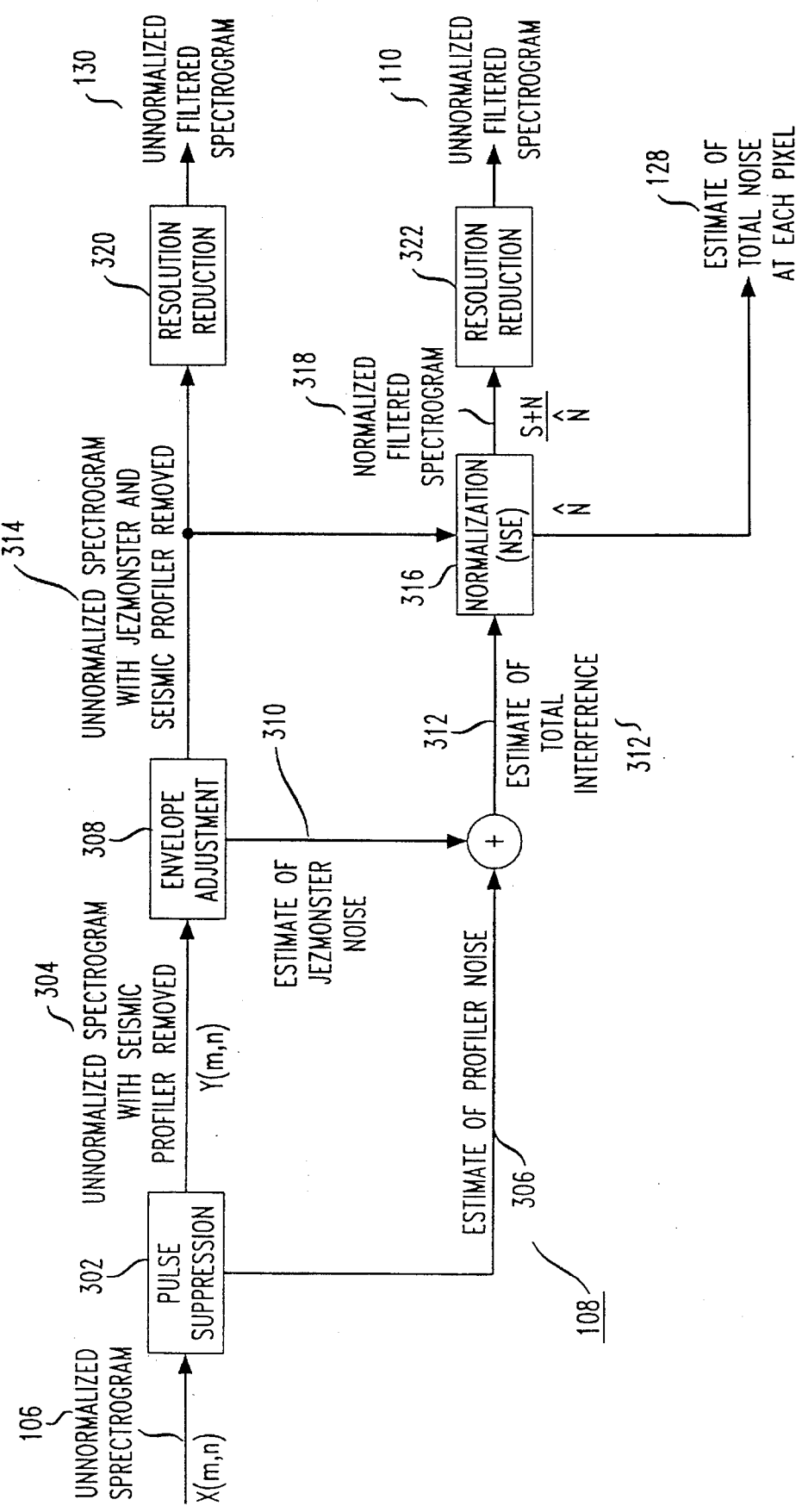
FIG. 3 shows a functional block diagram of interference rejection.

The unnormalized spectrogram 106 is input to the preprocessor 108. An operational block diagram of the preprocessor 108 is shown in FIG. 3. The preprocessor module 108 strives to remove two classes of interference that pose problems for Type-I signal detection and classification. The first class is impulsive in nature, with a short duration compared to the coherent integration interval used for spectral analysis; the other is persistent colored noise with a characteristic spectral envelope.

Impulsive interference can be caused by the explosive charges used to sound for oil deposits (seismic profiling), by active sonar, or by noise from nearby male finback whales. Depending on whether the duration of the interfering pulse is fractions of a second or several seconds, the energy of the interference may be spread over a frequency range of a few to many Hertz. The power of these interferers is typically great enough to saturate the acoustic monitoring equipment, effectively reducing the signal-to-noise ratio in the affected frequency and time regions to zero.

The other type of interference, i.e. colored noise with a characteristic spectral envelope, is caused by male finback whales, and is referred to as Jezmonster.

Referring to FIG. 3, the interference rejection module 108 first removes impulsive interference. A pulse suppression filter 302 applies a two-dimensional, non-linear, low-pass operation to the unnormalized spectrogram 106. A two dimensional window, 4 scan lines or pixels (i.e, time samples) by 15 pickets or pixels (i.e., frequency samples) in extent, is slid over the image, and the following operations are performed:

$$\bar{x}(m,n) = \frac{\sum_{i=1}^{N}(x(m,n+i)+x(m,n-i))}{2N}$$

where N is chosen to set the rejection bandwidth of the filter (e.g., N=50 in a preferred embodiment). X(m,n) is the log spectral power for a pixel at time equal to m and frequency equal to n.

$$y(m,n) = \begin{cases} x(m,n) - \left[ \bar{x}(m,n) - \frac{\bar{x}(m+1,n)+\bar{x}(m-1,n)}{2} \right] \\ \quad \text{if } \bar{x}(m,n) > \bar{x}(m+1,n) \text{ AND } \bar{x}(m,n) > \bar{x}(m-1,n) \\ x(n,m), \text{ otherwise} \end{cases}$$

x(m,n) is the log spectral power at the mth scan and the nth frequency picket, y(m,n) is the filtered output. The term slid, as used herein, is defined as performing the operations of the equations for each pixel in the image. The result of this operation is an unnormalized spectrogram with seismic profiler removed 304. The estimate of profiler noise 306 is also removed from the unnormalized spectrogram 106). The estimate of profiler noise 306 equals the absolute value of y(m,n)−x(m,n).

Then, an envelope adjustment module 308 removes Jezmonster signals, the second type of interference. The spectral envelope of this signal in the log power domain is described by the following relation:

$$j(n) = A_j([U(n) - U(n - n_c)]e^{\frac{(n-n_c)^2}{\sigma_l}} + U(n - n_c)e^{\frac{(n-n_c)^2}{\sigma_r}})$$

where $A_j$ is the maximum log power of the signal, $n_c$ is the center frequency picket, U(n) is the unit-step function, and $\sigma_l$, $\sigma_r$ are the left and right spread parameters, respectively. This is a gaussian model with amplitude. As centered at frequency $n_c$ with standard deviation $\sigma_e$ on the left of $n_p$ to the right of $n_c$. Acceptable ranges for these variables are: $2.0 \leq A_j \leq 5.0$; $2.0 \text{ Hz} \leq \sigma_e \leq 6.0 \text{ Hz}$; $2 \text{ Hz} \leq \sigma_r \leq 10 \text{ Hz}$; $14.0 \text{ Hz} \leq n_c \leq 17.0 \text{ Hz}$.

Using known curve-fitting methods, the set of these parameters ($A_j$, $n_c$, $\sigma_l$, and $\sigma_r$) that best fits the pulse-suppressed input scan (i.e., the unnormalized spectrogram with seismic profiler removed 304), are computed, and the results are compared to the set of ranges (provided above) known to be valid for Jezmonster. If the fit results indicate the presence of Jezmonster interference, the spectral estimate 310 is subtracted from the unnormalized spectrogram with seismic profiler removed 304 in order to mitigate the effects of the interference on the envelope and texture of other signals in the region. If the interference is so powerful that it saturates the acoustic monitoring equipment in the frequency range of the interference signal, any coexistent signals will have been irretrievably lost. However, it is still important to adjust the spectral envelope at this stage, since the presence of strong broadband energy will mask signals in neighboring frequency regions when the Noise Spectrum Equalization algorithm, discussed in the next section, is applied. The result of envelope adjustment module 308 is an unnormalized spectrogram with Jezmonster and seismic profiler removed (i.e., filtered unnormalized spectrogram 314).

3. Preprocessing

After interference rejection, the unnormalized filtered spectrogram 314 is noise-spectrum equalized using a Noise Spectrum Equalization (NSE) module 316 tuned for wideband signals. NSE 316 is used to flatten the noise spectrum of signals (i.e., dividing out the noise estimate). It transforms the filtered spectrogram 314 to a filtered normalized spectrogram 318. Thus, a signal-to-noise waveform is produced wherein (signal+noise)/(noise estimate) is computed for each pixel. The "noise" is the average of the noise approximations in the neighborhood of each pixel of the filtered spectrogram 314.

The "noise estimate" 128 is "noise" plus the estimate of total interference 312. NSE estimates the noise in the neighborhood of a pixel by averaging the data in a box around the pixel (the box can be any dimension, although 75×75 pixels is a good size). That average is the "noise."

After NSE, pairs of successive scans and pickets may be averaged together (integrated) by resolution reduction modules 320, 322 to reduce by a factor of two the time and frequency resolutions of the spectrogram. This provides some smoothing, which may be helpful to the analysis of the spectrogram. Then both the unnormalized filtered spectrogram 130 and normalized filtered spectrogram 110 are buffered for further processing.

The unnormalized filtered spectrogram 130 and the noise estimate 128 are used by feature extraction module 116. The unnormalized filtered spectrogram 130 is used to generate textural features and the noise estimate 128 is used to calculate amplitude of the signal object.

4. Energy Detection and Clustering

Referring again to FIG. 1, the next step is to select the regions of the spectrogram that contain sufficient energy for further processing. This step is performed by energy detection module 112. For narrowband signals, energy detection is typically done for each pixel by comparing that pixel to a threshold. However, this method is ill-suited to Type-I signals, because the wideband component of these signals causes many of the pixel values to be at or below the background noise level. It is necessary, therefore, to make detection decisions based on more than one pixel. The detection logic chosen divides the normalized filtered spectrogram 110 into rectangular regions that overlap in time and frequency; a detection decision is then made for each region (instead of each pixel). In a preferred embodiment, the regions overlap by half. Generally, more overlap produces smoother data, but at the cost of additional processing time. Less overlap results in a greater chance that a region might be detected that is not from a signal to be recognized.

Figure 4:
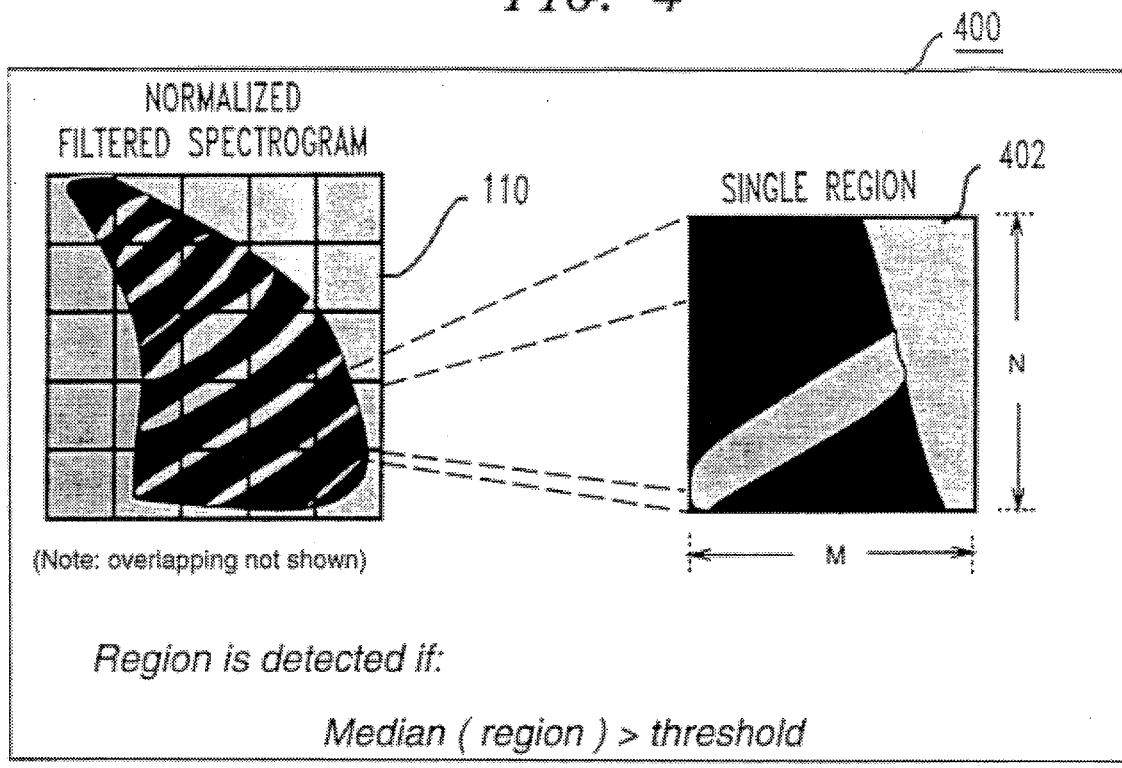
FIG. 4 shows a two-dimensional median power detection algorithm.

The energy detection process 400 is illustrated in FIG. 4. Given that $x_{m,n}$ refers to value of the spectrogram at pixel position (m,n), a rectangular region 402 of size M×N contains sufficient energy for further processing if for detection threshold T:

$$\sum_{m}^{M}\sum_{n}^{N} \Lambda(x_{m,n},T) > \frac{M \times N}{2} \text{ where } \Lambda(\alpha,\mu) = \begin{cases} 1 & \text{if } \alpha \geq \mu \\ 0 & \text{otherwise} \end{cases}$$

Thus, a region is detected if more than half of the pixels in the region have values above the threshold value T. T represents a threshold on the (signal+ noise)/noise ratio that one wishes to detect. The value T should be set greater than 1, since T=1 implies that the signal is non-existent.

The detection value of each region is computed as follows and saved for later processing:

$$\frac{1}{M+N}\sum_{m}^{M}\sum_{n}^{N}x_{m,n}$$

This value is the average pixel value in the region.

In accordance with a preferred embodiment, M=32 and N=32 are used. Although a good range for M and N is 16 to 64. The threshold value T is set to be 1.5, meaning that the signal must be at least half the strength of the noise to be detected.

This detection method has two desirable properties. First, the method is ideal for detection of wideband signals. Most narrowband signals of large amplitude have a bandwidth that is small in comparison to the frequency extent (i.e., value of N) of a detection region. Since the order-statistic provided by the detection algorithm simply counts the number of pixels above some threshold, a narrowband signal alone will not cause a region to be detected. However, a wideband signal that fills the region is likely to be detected. Second, the region-based detection scheme greatly reduces the number of inputs that will have to be examined by the Type-I signal/clutter neural network classifier, eliminating the need to examine individual pixels. Use of the simplified "regions" is accomplished by trading off the fine resolution of the signal's frequency and time limits. This tradeoff is a function of region size and the amount of overlap between adjacent regions.

In accordance with a preferred embodiment, the regions are set to overlap by half. The more overlap, the smoother the data, but the more processing is needed. The less overlap, the greater chance there is for an error in detection.

Once detected, regions are then clustered across time and frequency using a modified blob-coloring algorithm. The standard blob coloring procedure, discussed in Ballard et al., *Computer Vision*, Prentice-Hall (1982), states that if two detected regions touch, then they are part of the same object (blob), and are thus "clustered." The preferred embodiment uses a modified blob coloring procedure. According to the modification, two detected regions may not necessarily be part of the same object even though they touch. If two adjoining detected regions each belong to a different signal object, and the different signal objects only touch where these two regions touch, than they are not clustered. That is, if a first object only touches a second object in one place they are not clustered. The clusters of detected regions 114 are henceforth called "signal objects."

In standard blob-coloring, processing starts at the top, lefthand corner of the image and work your way to the right, then down. Now image, after blob-coloring a few rows of the image, blob A and blob B were next to each other but are still separate because they have not as yet touched. Upon processing the next row, it is determined that blob A and blob B touch in this row. Standard blob-coloring would merge blob A and blob B together into a single blob (i.e., signal object) and continue processing. Modified blob coloring, if these two blobs were seperate for the N previous rows above, even though the two blobs now touch, they will remain seperate. N equals 10 in a preferred embodiment, although $1<N<0$ is acceptable. If N equals 0, modified blob-coloring reduces to standard blob-coloring.

Also, note that this region detection algorithm produces the frequency limits of the signal objects, as a signal object begins at the lowest frequency region and ends at the highest frequency region. The signal objects now have known frequency extent and are ready to be further characterized and eventually classified as Type-I or clutter.

5. Feature Extraction

The present invention utilizes a neural network to classify the "signal objects" of the input timeseries signal 102 as Type-I or clutter. While there are many important aspects of neural network design, perhaps the most important of these is the choice of a data representation (features) for input to the network. A good representation can improve learning time and generalization ability; an efficient representation keeps the network size small and reduces the need for large training sets. A poor representation, on the other hand, can make learning difficult or even impossible. Therefore, feature extraction is a critical step in the processing, for it is this set of features that will be used by the neural network ensemble 120 and postprocessor 124 to make a Type-I/clutter decision.

For the problem of Type-I signal recognition, possible data representations range from statistical features (i.e., statistical representations) extracted from an input spectrogram image to, at the other extreme, the pixels from the normalized spectrogram 110 itself (sometimes referred to as a retina). The statistical representation has the advantage of keeping the number of input neurons small, but may be incomplete. The statistical representation places the burden of feature selection on the designer. The retina representation is complete in that it preserves nearly all the information available regarding the signal, but places the burden of feature selection and rule extraction on the neural network training algorithm.

The retina method is not well suited to the Type-I recognition problem because it requires rather large, burdensome networks that use an input neuron for each image pixel. Without drastic weight and connectivity constraints to reduce the complexity of the network, the system will not generalize well without large training sets, and may require expensive hardware to implement in real time systems. Other disadvantages stem from the fact that the retina input often contains a wealth of other, distracting information in addition to the signal of interest. Large training sets and an inordinate amount of time would be necessary to make the trained network insensitive to factors such as frequency translation, signal amplitude, background noise, and other (unrelated) nearby signals present in the retinal input. In addition to these drawbacks, decisions can be made only about whether Type-I energy exists somewhere in a retina. If the retina has a frequency extent that is large enough to capture multiple signals, then additional machine intelligence is required to determine which specific signals in the retina are Type-I.

In contrast, the statistical method focuses on a single signal object at a time, and can therefore make decisions on each signal object separately. The statistical method requires careful selection of the statistics that represent the signal objects. Ideally, the statistics selected should capture information regarding the entire spectrogram. A large pool of possibly important feature vectors has been evaluated and those carrying measurably useful information have been selected. Feature vector selection is performed by analyzing the extent to which a neural network used each feature vector. The present invention utilizes an Optimal Brain Damage (OBD) algorithm. The algorithm is described in LeCun et al., "Optimal Brain Damage," in Touretzky, ed., *Advances in Neural Information Processing Systems* 2 (NIPS 89), Morgan Kaufmann, San Mateo, Calif. (1990), pp. 598–605. A combination of traditional and textural feature vectors has been determined to perform remarkably well in discriminating Type-I signals from clutter. These feature vectors are described in the following sections.

5.1 Traditional Parameters

Traditionally, measures like frequency and bandwidth are used to characterize sonar signals. These measures are also important to the Type-I discrimination problem, if only in part. The following traditional parameters are extracted and used for Type-I recognition: frequency, bandwidth, and SNR of wideband signal component.

All measures are computed in a straightforward manner using the normalized filtered spectrogram 110, estimates of spectrogram noise 128, and the frequency limits of the signal as provided by the energy detection module 112.

5.2 Textural Descriptors

Although traditional parameters are somewhat useful for characterizing Type-I signals, the key to Type-I/clutter discrimination is to quantify measures of the texture of the wideband component. Texture is a feature by which an image may be described. Textural features contain information about the spatial distribution of tonal variations within a specified band of frequency of the spectrum. Thus, texture may be used to distinguish a certain signal from other signals within the same frequency band.

Most of confusable wideband clutter appears at the same frequencies in which Type-I energy occurs, and can exhibit very similar bandwidth and signal power as well. Fortunately, the most common source of confusable noise— from biologics (mostly whales) and seismic profilers—have markedly different textures. These differences can be difficult to describe, but can be quantifiably measured using the two methods described below.

5.2.1 Co-occurrence Analysis

Co-occurrence analysis characterizes the texture information of an image by determining the gray-tone relationships of neighboring pixels in an image. Co-occurrence analysis of texture has proven useful for classifying various textures in satellite images, such as discriminating farmland from a forest area. It is particularly useful in those cases when a good model of the texture does not exist, as in the case of Type-I signals. A detailed description of co-occurrence analysis is provided in Haralick et al., "Textural Features for Image Classification," *IEEE Transactions on Systems, Man, and Cybernetics*, Vol. SMC-3 No. 6, (1973), pp. 610–621.

The co-occurrence analysis algorithm is performed for each separate detected region of the unnormalized filtered spectrogram 130, and the individual results are clustered to describe the entire signal object. For each detected region, the processing first requires the formation of the gray-level co-occurrence probability matrices $P_{delta(\Delta x, \Delta y)}$, where delta $(\Delta x, \Delta y)$ is a position operator indicating the gray-tone spatial dependence relationship for the particular matrix. Each matrix is of dimensions k×k, where k is the number of possible intensity (gray-level) values a pixel $x_{m,n}$ can have. Then, for a region of size N×M, the elements p in the matrices are computed according to the following relationship:

$$P_{i,j} = \text{Probability}[x_{m,n} = i \text{ AND } x_{m+\Delta x, n+\Delta y} = j]$$

for all $(1 \leq i, j \leq k, 0 \leq n \leq N, 0 \leq m \leq M)$

In other words, P is a normalized frequency table for all transitions from one gray level to another between every set of two pixels in the region whose locations are related by $\Delta x$ and $\Delta y$.

For the characterization of Type-I signals, the P matrix is constructed for each of 30 different position operators delta $(\Delta x, \Delta y)$, designed based on knowledge of the textures that are to be discriminated. In a preferred embodiment, each matrix is of dimension 8×8, as eight gray levels are found to be sufficient for depicting the texture information.

In a preferred embodiment, the 30 position operators delta $(\Delta x, \Delta y)$ used are: (0,1), (0,2), (0,3), (0,4), (1,0), (2,0), (3,0), (4,0), (1,1), (2,2), (3,3), (4,4), (1,2), (1,3), (1,4), (2,1), (3,1), (4,1), (2,3), (2,4), (3,4), (3,2), (4,2), (4,3), (1,5), (1,6), (2,5), (2,6), (3,5), and (3,6).

For each of the 30 $P_{delta0}$ matrices, we compute:

- contrast = $\sum_{i=1}^{k} \sum_{j=1}^{k} (i-j)^2 p_{i,j}$

- correlation = $\sum_{i=1}^{k} \sum_{j=1}^{k} [(i-\mu_i)(j-\mu_j)/\sigma_i \sigma_j]$ Note that many other statistics are described in Haralick et al., "Textural Features for Image Classification," but these two were determined to be most useful for the Type-I recognition problem.

5.2.2 Striation Measurements and Aspect Determination

Many cases of Type-I signals display a striated texture, or a series of parallel lines, in their spectrogram. Striated texture often results from multi-path propagation. A two-dimensional Fourier transform analysis is used for determining whether striae are present.

The technique proposed by Ballard et al., *Computer Vision*, Prentice-Hall (1982) is used to determine the characteristics of the striae present in the texture of the spectrogram. The 2-dimensional Fourier power spectrum, $|F(u,v)|^2$ is computed for each of the regions of detected energy 114. The Fourier space is then partitioned into 16 equally sized wedges, corresponding to angles $\theta_j$. For each partition, calculate:

- $\text{power}_j = \sum_u \sum_v |F(u,v)|^2, \theta_j \leq \tan^{-1}\left[\frac{v}{u}\right] \leq \theta_{j+1}$

- $\text{angconf}_j = \dfrac{\text{power}_j}{\sum_{k=1}^{16} \text{power}_k}$

After the $\text{power}_j$ and $\text{angconf}_j$ values are calculated for each of the regions of detected energy 114, total $\text{power}_j$ and $\text{angconf}_j$ values are computed for each signal object. For example, total $\text{power}_j$ for a signal object is computed by summing all the $\text{power}_j$ values of the detected regions comprising the signal object. The 16 total $\text{power}_j$ and $\text{angconf}_j$ values (32 in all) for each signal object are passed to the neural network ensemble.

6. Neural Network Classifiers

In a preferred embodiment, an ensemble composed of five neural networks is used in the Type-I discrimination problem. Each network is sparsely connected, feedforward, and trained with a back-propagation algorithm (using both gradient descent and conjugate gradient methods). The training set consisted of approximately 100 hours' worth of single beam Type-I signals from 15 different types of sources and 100 hours' worth of clutter signals (man-made and biologic), totaling roughly 20000 exemplars.

Back-propagation training updates each weight $w_{ij}$ on the neural network iteratively. At the $n^{th}$ iteration, we update weight $w_{ij}$ as:

$$\Delta W_{ij}(n) = \eta(\delta_j y_i) + \beta \Delta w_{ij}(n-1)$$

where $\Delta w_{ij}(n)$ is the change to weight $w_{ij}$ at iteration n, $\eta$ is the learning rate, $\Delta$ is the gradient at neuron j, $Y_i$ is the output of neuron i, $\beta$ is the momentum team, and $\Delta w_{ij}(n-1)$ is the change made to weight $w_{ij}$ at iteration n−1).

$\beta$ is typically between 0 and 0.5. $\eta$ is typically between 0.1 and 0.7. A single $\eta$ is chosen for the entire network. To de-emphasize a set of feature vectors during training, for each weight $w_{ij}$ connected to a given feature vector, $\eta$ is multiplied with a variable $\alpha_{ij}$ to change the effective learning rate of the neural network. In a preferred embodiment, $\alpha_{ij}$ is set to 0.2 to de-emphasize and to 1.0 to emphasize a feature vector.

Each network in the ensemble has 140 input neurons and 5 output neurons. The input neurons consist of the traditional parameters, the results of co-occurrence analysis, and striation measurements. The input neurons are as follows:

60 co-occurrence features (contrast and correlation values for each of the 30 co-occurrence direction vectors);

16 $power_j$ values;

16 $angconf_j$ values;

lowest frequency of the signal object;

highest frequency of the signal object;

average frequency of the signal object;

maximum signal-to-noise estimate for the signal object (maximum detection value of all the regions clustered into the signal object);

minimum signal-to-noise estimate for the signal object (minimum detection value of all the regions clustered into the signal object);

average signal-to-noise estimate for the signal object;

42 features relating to signal frequency, computed as follows: Divide the spectrogram into 42 frequency slices, all equally spaced. If any part of the signal exists in a slice, the value of the slice is 1; else −1. Thus, 42 values (each either 1 or −1) are derived. The 42 numbers are used to help the neural networks pay attention to frequency information, since devoting a lot of inputs to a particular parameter is one way of forcing neural networks to pay attention to that parameter.

Figure 5:
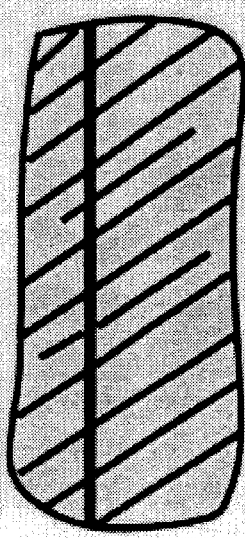
FIG. 5 shows the classes of Type-I signals recognized by the neural network system.
Figure 5:
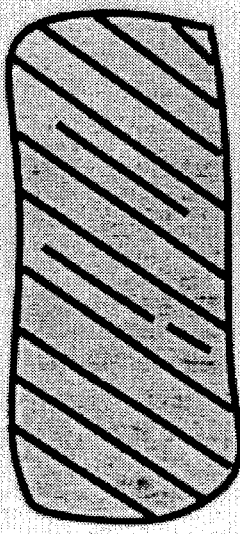
Figure 5:
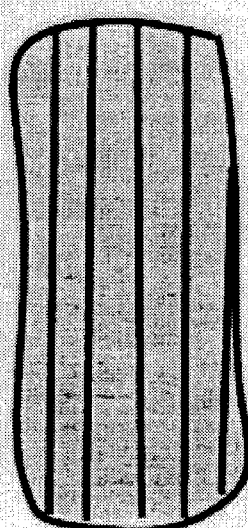
Figure 5:
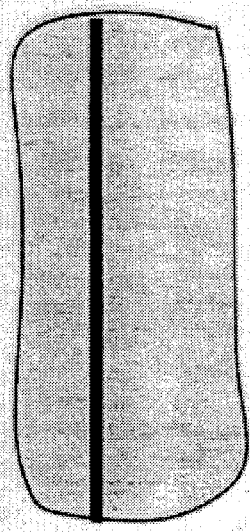

The output neurons correspond to the four classes of Type-I signals shown in FIG. 5 (i.e., negatively striated Type-I, positively striated Type-I, vertically striated Type-I, and un-striated Type-I), and clutter. Clutter is any signal other than Type-I.

Each of the five networks in the ensemble are all multilayer networks. In a preferred embodiment, all five neural networks have either one or two hidden layers. As would be readily apparent, other network architectures can be implemented without departing from the spirit or scope of the invention.

Each of the five neural networks in the ensemble is trained using a technique that allows a network to "favor" a specific subset of its input features. Each is trained on the same data set, but each has been adapted to "pay close attention" to a different subset of the input textural descriptors. By making each network concentrate on a different subset of the input, the neural networks are forced to have dissimilar biases. A bias is a reason to favor one decision over another, and in the case of neural networks, is a by-product of training. These differences in the biases allow the neural networks to complement each other when working in an ensemble. This point can be better understood by observing that five similar neural networks offer no advantage over just one; for the ensemble to be useful, the networks must sometimes disagree, as discussed in Hansen et al., "Neural Network Ensembles," *Trans. on Pattern Analysis and Machine Intelligence*, Vol. 12, No. 10 (1990).

As stated above, the five networks used in the ensemble are all multilayer networks. It is preferable to use different numbers of hidden layers in the different neural networks. By using different architectures (i.e., number of layers), the networks are forced to be as different as possible. Although the number of layers is not critical to each network by itself, this technique helps to make the five networks disagree, and therefore work better together. In a preferred embodiment, two of the five neural networks have 2 hidden layers, while three of the five neural networks have 1 hidden layer.

Each network of the ensemble is trained to favor a specific subset of the input by having different learning rate parameters for the neurons connected to the specific input features. See D.E. Rumelhart et al., "Learning Internal Error Representations by Error Propagation," *Parallel Distributed Processing: Explorations in the Microstructure of Cognition*, Vol. 1, MIT Press, Cambridge, Mass. for a general discussion of learning rates. For example, if the network is to pay more attention to co-occurrence statistics than frequency data, the learning rates for the neurons connected to the co-occurrence statistics are made much larger than the learning rates for the neurons connected to frequency data.

As discussed above, the 140 input features are broken down into 4 subsets: (1) co-occurrence data (60 values); (2) 2-D Fast Fourier transform data (32 values); (3) frequency data (42 values); and (4) other features (6 values). Each of four networks are trained to concentrate on (i.e., favor) each of the four subsets. The fifth network is trained without concentrating on any of the four subsets. Further, in each network, a learning rate of 1 is used for the favored subset of features, while a learning rate of 0.2 is used for the other features.

In addition to training using different learning rates for different neurons, each network undergoes the Optimal Brain Damage (OBD) algorithm to prune up to half of the weights in the original, fully-connected neural network architecture. This degree of pruning results in a rather sparsely-connected structure that improves the network's ability to generalize. After pruning, each network is retrained and repruned multiple times. In a preferred embodiment, each network is pruned and re-trained twice. Although some pruning improves performance, a network will no longer perform very well if too many weights are pruned.

OBD assigns a saliency $S_{ij}$ for the connection between neuron i and neuron j. $S_{ij}$ measures the effect that removing that connection entirely would have on the neural network's performance. Next, a feature vector $f_n$ is input into the neural network. The connections that emanate from the feature vector's input neuron each have an associated saliency. If a feature vector were to be deleted, its connections would not exist. The effect of removing all the connections to that feature vector are measured to determine the effect of not using a feature vector. The importance measure for a given feature vector is calculated by summing the saliences of the connections to it. This is done for all feature vectors. The importance of each feature vector are ranked, and the most important feature vectors are kept.

7. Postprocessing

The postprocessor has three functions:

determine the class of Type-I signal to which each network assigned the input pattern combine the individual results of the ensemble of neural networks to give a final classification to the input pattern permit adjustments in system performance Each neural network assigns the input (received signal) to one of five classes: Negatively Striated Type-I, Positively Striated Type-I, Vertically Striated Type-I, and Un-striated Type-I, and unknown. First, the network produces an activation level for each of the five outputs. Then, the input signal is assigned to class k if the $k^{th}$ output neuron has a higher activation level than that of the other 4 units and if this level exceeds a threshold T. If none of the activation levels exceed T, then the network is said to have rejected its input, in effect assigning it to an "UNKNOWN" class.

The final classification is determined by combining the classes of Type-I signals from each individual neural network according to the following rule. If the majority (i.e. 3 or more) of the networks assign the signal to the same class, then this class will also be the signal's final classification. Otherwise (no majority), the signal's final classification is "UNKNOWN."

By varying the activation threshold and/or changing the rules for combining the individual votes, it is possible to adjust system performance. For example, by raising the activation output threshold, the rejection rate can be raised, reducing the detection and false-alarm rams accordingly. System performance can be altered in this way by imposing on the outputs whatever cost-function is appropriate.

8. System Performance

Figure 6A:
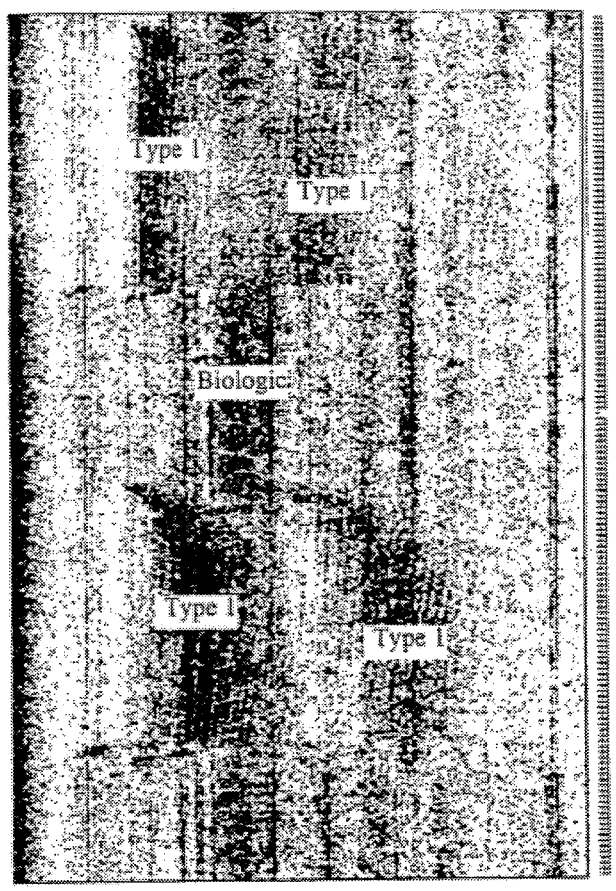
FIG. 6 shows the result of the signal/clutter classification of the spectrogram data as produced by the neural network.
Figure 6B:
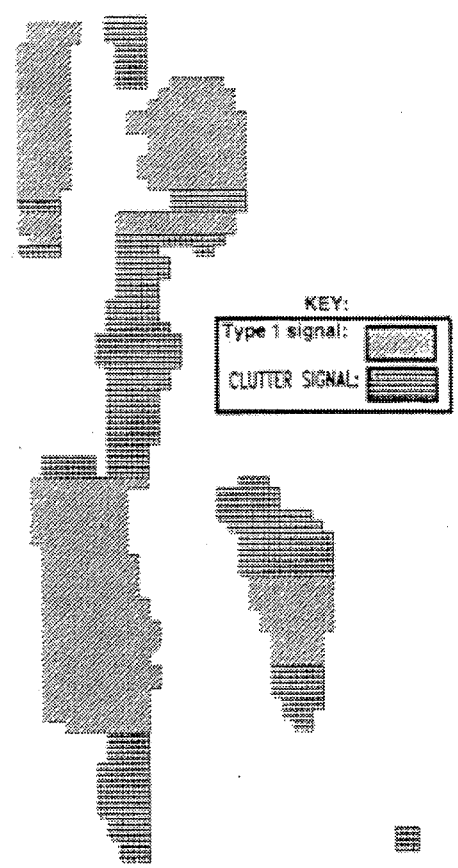

FIG. 6 shows the result of the present invention overlaid on a single beam of spectral data. FIG. 6A shows a single beam spectrogram of a received sonar signal 102. FIG. 6B shows how the present invention classifies the spectrogram for each detected region 114.

Figure 7:
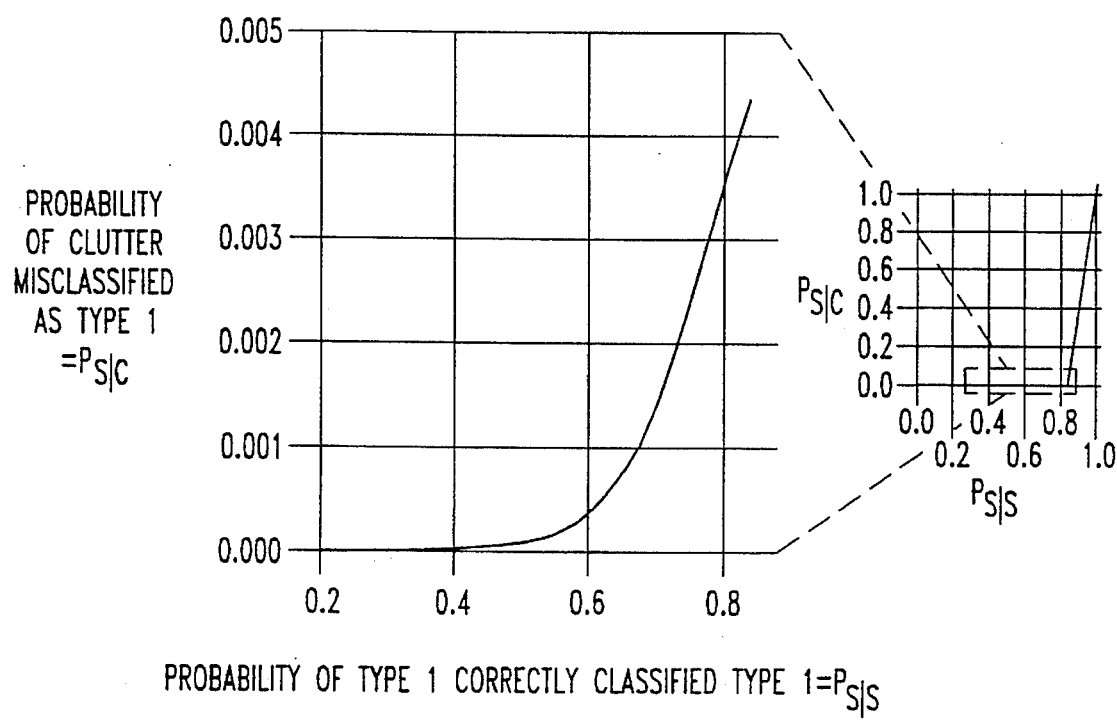
FIG. 7 shows the probability of detection of the signal versus the probability of false alarm.

FIG. 7 shows the receiver-operating-characteristics (ROC) curve for the system, which plots detection probability versus false alarm probability. The curve was obtained by varying the post-processor's activation threshold T for a test set of 10000 never-before-seen (by the neural networks) exemplars, half of which were Type-I energy and half of which were confusable clutter. The figure shows that the proposed system detects 85% of all Type-I energy present during a processing cycle, with a 0.004 probability of false alarm. Recent site trials show that the system correctly classifies about 95% of all Type-I signals in at least two consecutive processing cycles during which the signal is present.

A system has been described that provides a novel means of automatically detecting, tracking, and classifying Type-I signals. Lab tests and site trials show that the system provides excellent characterization and discrimination performance. Additional measures of signal context, such as whether dynamics are present, could be used to further improve performance.

Although the present invention is described with reference to Type-I signals, the present invention is applicable for distinguishing other types of sonar signals, so long as the two types of sonar signals have sufficiently different textures. For example, as would be apparent to one skilled in the art, the present invention could be used to distinguish Jezmonster signals from all other types of signals. There are many aspects of the present invention that could be changed if the signal of interest changes. Most importantly, however, the neural network bank 120 would need to be trained to recognize the signal of interest or signals of interest.

If the exploitable features of the signal of interest are different from those of Type-I signals, then better system accuracy could be attained by inputting those features into the neural network bank 120 as well. For Jezmonster, the input features used to implement the present invention would be acceptable. Signal feature extraction module 116 would still used textural descriptors based on co-occurence and some traditional parameters, it might not use stiation features and it might use additional features not needed for Type-I signal recognition.

Other signals might also require slightly different signal processing. While one would always want the system to process a spectrogram image, that image might be different for different signals. Things like frequency resolution, time resolution, and/or frequency ranges would almost certainly be different. Therefore, unit 104 might change slightly, although it would still be doing Fast Fourier transforms and producing a spectrogram.

Furthermore, the interference rejection unit 108 would also be altered for recognition of signals other than Type-I. For example, pulse suppression filter 302 and/or envelope adjustment module 308 could be removed completely if Jezmonster interference is not a concern, or they could be replaced with alternate processing to remove some other kind of interference. If these units were eliminated, the NSE 316 would still exist, but then the estimate of total noise 128 would only consist of the noise value that the NSE estimates (based on the neighborhood of each pixel) rather than this noise pluse the estimate of total interference as it currently does for recognition of Type-I signals.

While the invention has been particularly shown and described with reference to preferred embodiments thereof, it will be understood by those skilled in the art that various changes in form and details may be made therein without departing from the spirit and scope of the invention.

What is claimed is:

1. A method for characterizing a sonar signal captured by sonar listening devices, the method comprising the steps of:
   (1) characterizing a spectrogram generated from a sonar signal in terms of textural features and signal processing parameters;
   (2) inputting to a plurality of trained neural networks said textural features and said signal processing parameters of said spectrogram, wherein each of said plurality of trained neural networks is trained to favor a different subset of said textural features and said signal processing parameters; and
   (3) classifying components of said sonar signal as characteristic texture or clutter using said trained neural network.

2. The method of claim 1, wherein said spectrogram is generated using sliding-window Fast Fourier Transform analysis.

3. The method of claim 1, further comprising the steps of:
   (1) filtering said spectrogram to remove Jezmonster and seismic profiler energy to produce a filtered spectrogram;
   (2) generating a normalized spectrogram from said filtered spectrogram using a noise spectrum equalization procedure optimized for wideband signals;
   (3) generating an integrated spectrogram by reducing the frequency and time resolutions of said normalized spectrogram by integration;
   (4) partitioning said integrated spectrogram into overlapping, two-dimensional regions; and
   (5) selecting regions whose median powers are above a detection threshold to produce selected regions;
   (6) clustering said selected regions into signal objects using a blob-coloring algorithm; and
   (7) deriving said textural features and said signal processing parameters from measurements of said signal objects, said filtered spectrogram, and said normalized spectrogram.

4. The method of claim 1, wherein said textural features include co-occurrence analysis results, striation measurements, and aspect determination results of said sonar signal.

5. The method of claim 1, wherein said signal processing parameters include frequency measurements, bandwidth, signal-to-noise ratio, and amplitude of the signal component of said sonar signal.

6. The method of claim 1, wherein said textural features and said signal processing parameters used by said plurality of trained neural networks are selected by an Optimal Brain Damage method.

7. The method of claim 1, wherein each of said plurality of trained neural networks is trained to favor a subset of said textural features and said signal processing parameters by use of higher learning rates for the neurons connected to said subset of said textural features and said signal processing parameters.

8. The method of claim 1, wherein said trained neural network is a sparsely connected, feedforward network, trained with the back-propagation algorithm.

9. An apparatus for characterizing the sounds of ocean captured by sonar listening devices, comprising:

means for generating a spectrogram from a sonar signal;

means for characterizing said spectrogram in terms of textural features and said signal processing parameters; and a plurality of neural networks trained to classify components of said sonar signal as characteristic texture or clutter based on said textural features and said signal processing parameters, wherein each of said plurality of neural networks has been trained to favor a subset of said textural features and said signal processing parameters.

10. An apparatus according to claim 9, further comprising a preprocessor, said preprocessor comprising:

filter means for removing Jezmonster and seismic profiler energy to generate a filtered spectrogram; and normalization means for normalizing said filtered spectrogram using a noise spectrum equalization algorithm optimized for wideband signals to generate a normalized spectrogram.

11. The apparatus according to claim 10, further comprising detection means for selecting regions whose median powers are above a detection threshold for inputting to said means for characterizing.

* * * * *